United States Patent
Koh et al.

(10) Patent No.: US 12,008,261 B2
(45) Date of Patent: Jun. 11, 2024

(54) METHOD AND DEVICE FOR ACCESSING MEMORY

(71) Applicant: ELECTRONICS AND TELECOMMUNICATIONS RESEARCH INSTITUTE, Daejeon (KR)

(72) Inventors: Kwang-Won Koh, Daejeon (KR); Kang Ho Kim, Daejeon (KR); Changdae Kim, Daejeon (KR); Taehoon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 115 days.

(21) Appl. No.: 17/741,187

(22) Filed: May 10, 2022

(65) Prior Publication Data

US 2022/0365712 A1    Nov. 17, 2022

(30) Foreign Application Priority Data

May 11, 2021    (KR) .......................... 10-2021-0060779

(51) Int. Cl.
  *G06F 3/06*    (2006.01)
(52) U.S. Cl.
  CPC .......... *G06F 3/0656* (2013.01); *G06F 3/0604* (2013.01); *G06F 3/0679* (2013.01)

(58) Field of Classification Search
  CPC .... G06F 3/0656; G06F 3/0604; G06F 3/0679; G06F 3/061; G06F 12/1027; G06F 3/067; G06F 12/1009; Y02D 10/00
  See application file for complete search history.

(56) References Cited

U.S. PATENT DOCUMENTS

| | | |
|---|---|---|
| 8,943,294 B2 | 1/2015 | Cha et al. |
| 10,353,626 B2 | 7/2019 | Kim et al. |
| 10,754,547 B2 | 8/2020 | Kim et al. |
| 2018/0081567 A1* | 3/2018 | Goel ..................... G06F 3/0656 |
| 2019/0114079 A1* | 4/2019 | Kim ........................ G06F 12/02 |
| 2020/0371692 A1 | 11/2020 | Van Doorn et al. |
| 2022/0129521 A1* | 4/2022 | Surti ..................... G06F 12/128 |
| 2022/0284299 A1* | 9/2022 | Lee ........................ G06N 3/084 |

FOREIGN PATENT DOCUMENTS

| | | |
|---|---|---|
| KR | 10-2017-0092430 A | 8/2017 |
| KR | 10-2020-0051461 A | 5/2020 |

* cited by examiner

*Primary Examiner* — Zhuo H Li (57) ABSTRACT

A memory access method and device are provided. A memory access method may include: identifying, when an access to a page of a remote memory occurs, a type of the access; allocating a sparse buffer when the access is a sparse write; storing data for the sparse write in the sparse buffer; storing an address for the sparse write as a key and the sparse buffer as a value in a buffer table; and updating an instruction pointer to point to a next instruction.

16 Claims, 10 Drawing Sheets

METHOD AND DEVICE FOR ACCESSING MEMORY

CROSS-REFERENCE TO RELATED APPLICATION

This application claims priority to and the benefit of Korean Patent Application No. 10-2021-0060779 filed in the Korean Intellectual Property Office on May 11, 2021, the entire contents of which are incorporated herein by reference.

BACKGROUND OF THE DISCLOSURE

(a) Field of the Disclosure

The present disclosure relates to a memory access method and device, and more specifically, to a remote memory management method and device for performing access to a remote memory in a disaggregated memory system at a unit smaller than a page, in other words, a sub-page unit.

(b) Description of the Related Art

A disaggregated memory system operates by using a memory of a local host machine in which an application being executed is located and a memory of a remote machine connected by interconnect. For example, by locating data accessed by an application in a local memory and by locating data not being accessed by the application in a remote memory, a disaggregated memory system may provide a large capacity memory and simultaneously provide a low memory access delay time. Particularly, due to development of interconnect between nodes, a delay time for accessing the remote memory is being minimized, and performance thereof is improved by providing a high bandwidth. In addition, the disaggregated memory system provides an advantage of capable of more flexibly using a memory of a host machine.

However, since the remote memory has a longer access time and lower bandwidth than the local memory, performance degradation of a computing system may occur. In order to prevent performance degradation due to remote memory access, it is possible to minimize the performance degradation by distinguishing between frequently accessed data and relatively infrequently accessed data among the data used by the application to respectively locate them in the local memory and the remote memory. Accordingly, the frequently accessed data may be accessed through a high-performance local memory, and the rarely accessed data may be accessed through a low-performance local memory.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a memory access method and device having advantages of reducing network resource consumption due to remote memory access even when sparse access occurs in a disaggregated memory system.

An example embodiment of the present disclosure provides a memory access method, including identifying, when an access to a page of a remote memory occurs, a type of the access, allocating a sparse buffer when the access is a sparse write, storing data for the sparse write in the sparse buffer, storing an address for the sparse write as a key and the sparse buffer as a value in a buffer table, and updating an instruction pointer to point to a next instruction.

The memory access method may further include, when a read access to the page occurs, searching the buffer table by using an address for the read access as a key, and determining from the searched result whether a sparse buffer corresponding to the address for the read access exists.

The memory access method may further include, when it is determined that the sparse buffer corresponding to the address for the read access exists, fetching the page from the remote memory into a local memory, reflecting the data stored in the sparse buffer to the fetched page, and mapping the reflected page into an address space.

The memory access method may further include, when it is determined that the sparse buffer corresponding to the address for the read access does not exist, fetching the page from the remote memory into a local memory, and mapping the fetched page into an address space.

The storing of the data for the sparse write in the sparse buffer may include storing an address offset for the sparse write in the sparse buffer.

The memory access method may further include, after the page is fetched into a local memory from the remote memory, when a memory shortage of the local memory occurs, deleting the page from the local memory and maintaining the sparse buffer.

The memory access method may further include, after the page is deleted from the local memory, when a read access to the page occurs, fetching the page from the remote memory into the local memory, reflecting the data stored in the sparse buffer to the fetched page, and mapping the reflected page into an address space.

A page related to the sparse buffer in a local memory may be set to read-only.

The memory access method may further include, when a write access to the page related to the sparse buffer occurs in the local memory, deleting a record related to the sparse buffer from the buffer table, deleting the sparse buffer, allowing write to the page, and indicating that the page has been changed.

The memory access method may further include writing back the indicated page to the remote memory.

Another example embodiment of the present disclosure provides a memory access device, including a local memory into which a page of a remote memory is able to be fetched, and a sparse buffer manager, wherein the sparse buffer manager is configured to identify, when an access to the page of the remote memory occurs, a type of the access, allocate a sparse buffer when the access is a sparse write, store data for the sparse write in the sparse buffer, store an address for the sparse write as a key and the sparse buffer as a value in a buffer table, and update an instruction pointer to point to a next instruction.

When a read access to the page occurs, the sparse buffer manager may be configured to search the buffer table by using an address for the read access as a key and determine from the searched result whether a sparse buffer corresponding to the address for the read access exists.

When it is determined that the sparse buffer corresponding to the address for the read access exists, the sparse buffer manager may be configured to fetch the page from the remote memory into the local memory, reflect the data stored in the sparse buffer to the fetched page, and map the reflected page into an address space.

When it is determined that the sparse buffer corresponding to the address for the read access does not exist, the sparse buffer manager may be configured to fetch the page from the remote memory into the local memory and map the fetched page into an address space.

The storing of the data for the sparse write in the sparse buffer may include storing an address offset for the sparse write in the sparse buffer.

After the page is fetched into the local memory from the remote memory, when a memory shortage of the local memory occurs, the sparse buffer manager may be configured to delete the page from the local memory and maintain the sparse buffer.

After the page is deleted from the local memory, when a read access to the page occurs, the sparse buffer manager may be configured to fetch the page from the remote memory into the local memory, reflect the data stored in the sparse buffer to the fetched page, and map the reflected page into an address space.

A page related to the sparse buffer in the local memory may be set to read-only.

When a write access to the page related to the sparse buffer occurs in the local memory, the sparse buffer manager may be configured to delete a record related to the sparse buffer from the buffer table, delete the sparse buffer, allow write to the page, and indicate that the page has been changed.

The sparse buffer may write back the indicated page to the remote memory.

According to example embodiments of the present disclosure, it is possible to reduce access to a remote memory by using a sparse buffer when sparse access occurs to save network resources, to reduce waste of a local memory, and to reduce a delay time.

DETAILED DESCRIPTION OF THE EMBODIMENTS

The present disclosure will be described more fully hereinafter with reference to the accompanying drawings, in which example embodiments of the disclosure are shown. As those skilled in the art would realize, the described example embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of other elements but not the exclusion of any other elements.

In addition, terms such as " . . . part," " . . . portion," "er/or," or "module" described in the present specification may mean a unit that may process at least one function or operation disclosed in this specification, and the unit may be implemented by hardware, software, or a combination thereof.

Figure 1:
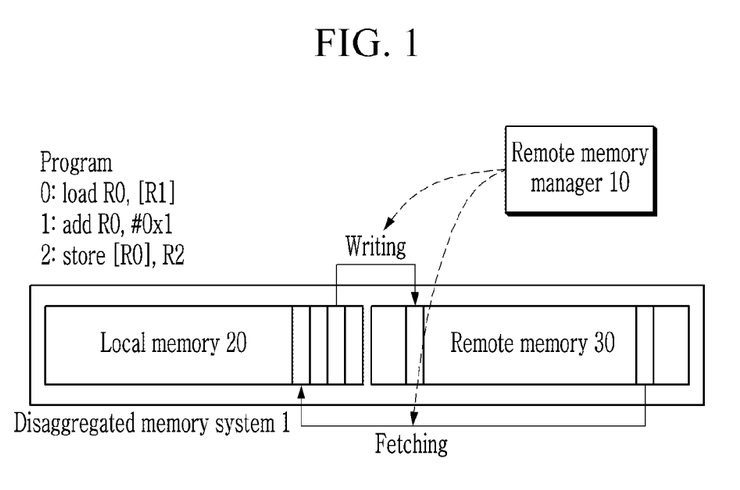
FIG. 1 is a diagram for explaining a disaggregated memory system according to an example embodiment of the present disclosure.

FIG. 1 is a diagram for explaining a disaggregated memory system according to an example embodiment of the present disclosure.

Referring to FIG. 1, a disaggregated memory system 1 according to an example embodiment of the present disclosure may have a memory structure of a local memory 20 and a remote memory 30, and may include a remote memory manager 10 configured to manage the memory structure.

The remote memory manager 10 may perform an operation of fetching a page of the remote memory 30 into the local memory 20 or of writing (writeback), when the local memory 20 is changed, a changed page to the remote memory 30.

When a page fault occurs due to access to the remote memory 30, the remote memory manager 10 checks the reason for the memory access and an access address. The page fault occurs when there is no physical memory address mapped to a virtual memory address accessed by a program. The disaggregated memory system generates the page fault for a page existing in the remote memory 30, and the remote memory manager 10 fetches an accessed memory page from the remote memory 30 to the local memory 20 and maps it to an address space of an application so that the application may access it.

In this case, since the local memory 20 needs to reserve a space for the accessed memory page, the remote memory manager 10 selects a portion of the local memory 20 to write (writeback) it to the remote memory 30, and deallocates the corresponding memory page to prepare for additional remote memory access. The fault caused by the remote memory access may be caused by a memory access due to instruction fetching for program execution, page table walk of a memory management unit (MMU) due to translation lookaside buffer (TLB) miss, and execution of memory access instructions.

Hereinafter, a memory access method and device according to example embodiments of the present disclosure in which efficiency is improved in consideration of sparse access will be described in detail, in the disaggregated memory structure in which the above-described page fault-based remote memory manager 10 is targeted and that operates by using the page faults caused by the remote memory access.

Figure 2:
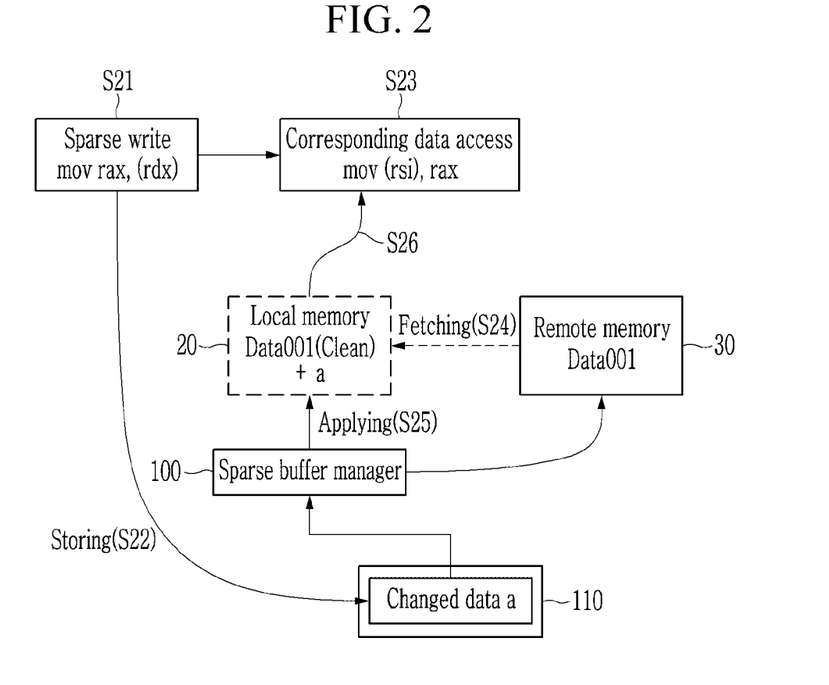
FIG. 2 is a diagram for explaining that a memory access device according to an example embodiment of the present disclosure performs sparse write instruction processing.

FIG. 2 is a diagram for explaining that a memory access device according to an example embodiment of the present disclosure performs sparse write instruction processing.

Referring to FIG. 2, a memory access device according to an example embodiment of the present disclosure may include a sparse buffer manager 100 in the remote memory manager 10 having the disaggregated memory structure.

When an access to a page of the remote memory 30 occurs, the sparse buffer manager 100 may identify a type of the access.

When the access is sparse write (S21) to the remote memory 30, the sparse buffer manager 100 decodes the instruction to extract an address and data for the sparse writing.

The sparse buffer manager 100 may store (S22) that there is change data (a) for the corresponding page located in the remote memory 30. Specifically, the sparse buffer manager 100 may allocate a sparse buffer 110, and may store data for sparse writing in the sparse buffer 110. In this case, the storing of the data for sparse writing in the sparse buffer 110 may be implemented by storing an address offset for sparse writing in the sparse buffer 110.

The sparse buffer manager 100 may use the address for the sparse writing as a key and store the sparse buffer 110 as a value in a buffer table so that it may be retrieved when processing by the read instruction word later.

Thereafter, when the application refers to data located at the same address (S23), the sparse buffer manager 100 may fetch a page from the remote memory 30 to the local memory 20 (S24). In addition, the sparse buffer manager 100 may reflect or apply the changed data (a) stored in the sparse buffer 110 to the local memory 20 (S25), may map it to an address space so that the application may use it, and may allow the application to directly access the instruction (S26).

Next, write emulation may be performed by updating an instruction pointer (IP) to point a next instruction of the write instruction so that the write instruction is not executed again before the control is transferred to the application.

Figure 3:
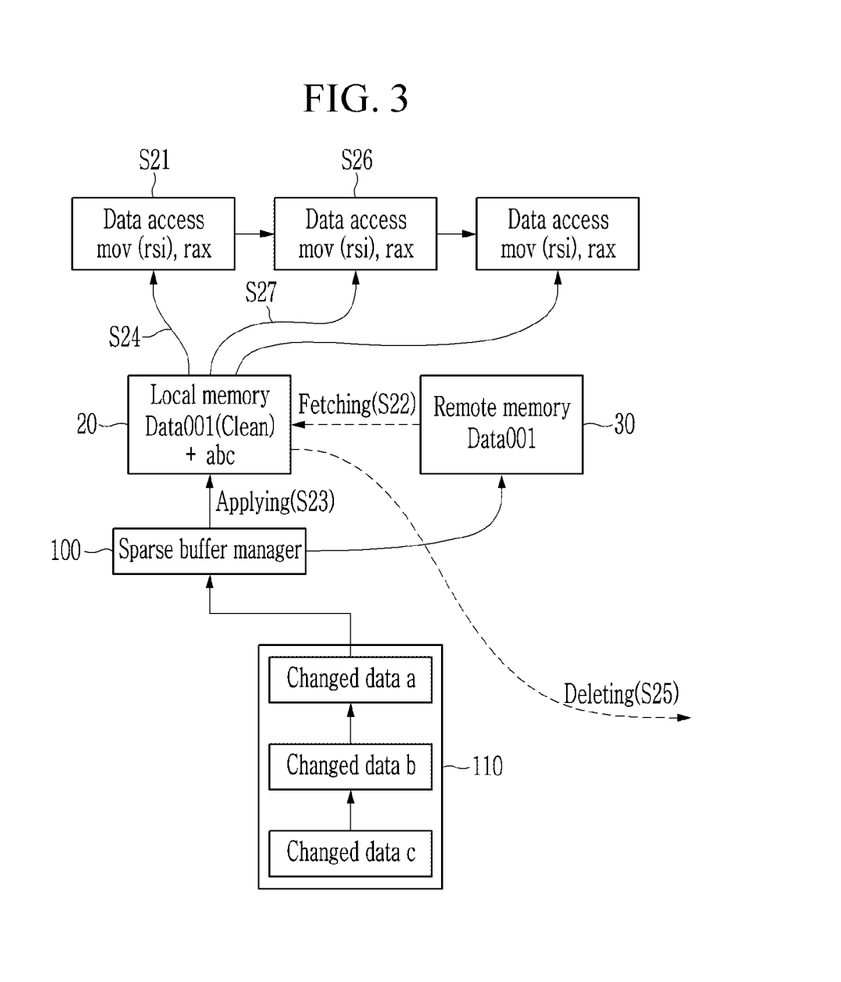
FIG. 3 is a diagram for explaining that a memory access device according to an example embodiment of the present disclosure performs data access processing for a sparse buffer manager.

FIG. 3 is a diagram for explaining that a memory access device according to an example embodiment of the present disclosure performs data access processing for a sparse buffer manager.

Referring to FIG. 3, In a situation in which the changed data (a, b, and c) are stored in the sparse buffer 110 by the sparse buffer manager 100, data access (load) (S21) has occurred. When the data access (S21) occurs, the page in the remote memory 30 is fetched (322) into the local memory 20.

In this case, the sparse buffer manager 100 may search the buffer table by using the address for read access as a key. From the search result, it may be determined whether or not the sparse buffer 110 corresponding to the address for read access exists.

In the present embodiment, since the changed data (a, b, and c) are stored in the sparse buffer 110, these data are reflected or applied to the page fetched in the local memory 20 (S23), and by mapping the reflected or applied page to the address space of the application, it is possible to support the application to access data through data access instruction (S24).

When it is determined that the sparse buffer 110 corresponding to the address for read access does not exist, the sparse buffer manager 100 may map the page fetched in the local memory 20 to the address space of the application as it is.

Then, when it is determined that a page for Data001 needs to be written to the remote memory 30 due to a memory shortage in the local memory 20, the sparse buffer manager 100 does not store the corresponding page in the remote memory 30, but simply drops the page for Data001 to the local memory 20 (S25), and maintains the sparse buffer 110 as it is.

After that, after deleting the page for Data001 from the local memory 20, when a read access (S26) to the page for Data001 occurs, the sparse buffer manager 100 fetches the page from the remote memory 30 to the local memory 20, reflects the data stored in the sparse buffer 110 to the fetched page, and maps the reflected page to the address space, so that it is possible to enable the application to access data (S27) through the data access instruction.

According to this method, even if the application later accesses the local memory 20, it may be regenerated by using the changed data managed in the sparse buffer manager 100 and the page for Data001 stored in the remote memory 30, thereby reducing the number of write and thus alleviating the write amplification problem.

Figure 4:
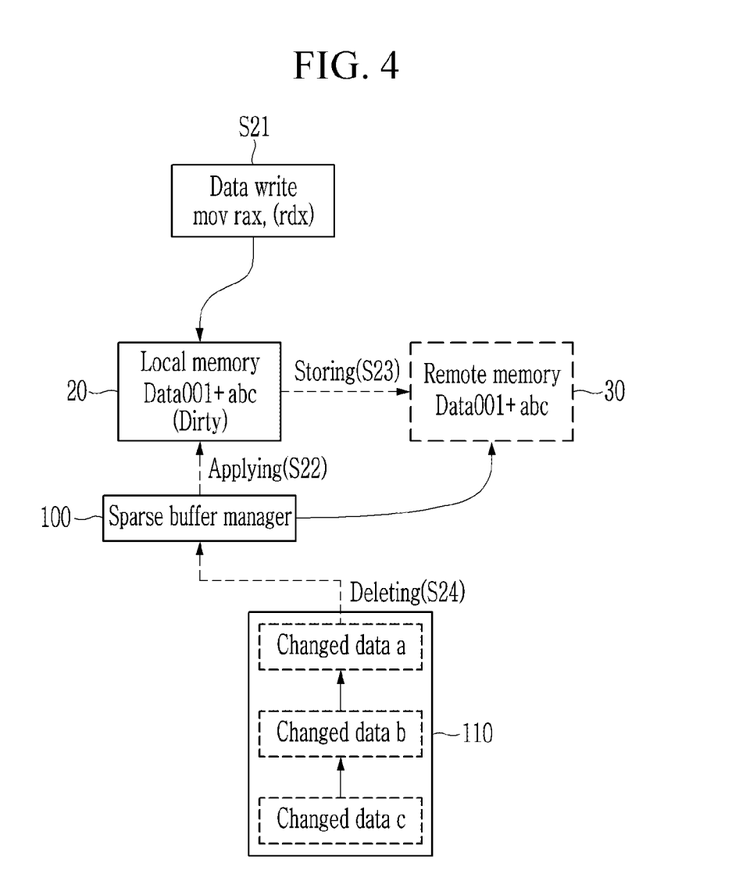
FIG. 4 is a diagram for explaining that a memory access device according to an example embodiment of the present disclosure performs sparse buffer data processing according to a change of a local memory.

FIG. 4 is a diagram for explaining that a memory access device according to an example embodiment of the present disclosure performs sparse buffer data processing according to a change of a local memory.

Referring to FIG. 4, it illustrates a case in which the write instruction for the page for Data001 located in the local memory 20 is performed. Memory pages managed by the sparse buffer manager 100 (that is, pages related to the sparse buffer) are set to read-only when fetched into the local memory 20.

Thereafter, when the write access (S21) to the page related to the sparse buffer 110 occurs in the local memory 20, the sparse buffer manager 100 may delete a record for the sparse buffer 110 from the buffer table, may delete the sparse buffer 110 (S24), may allow write to the corresponding page of the local memory 20, and may indicate that the corresponding page has been changed (S22).

Thereafter, when it is determined that the page for Data001 needs to be written to the remote memory 30 due to a memory shortage in the local memory 20, the sparse buffer manager 100 may write back the indicated page to the remote memory 30 (S23).

Figure 5:
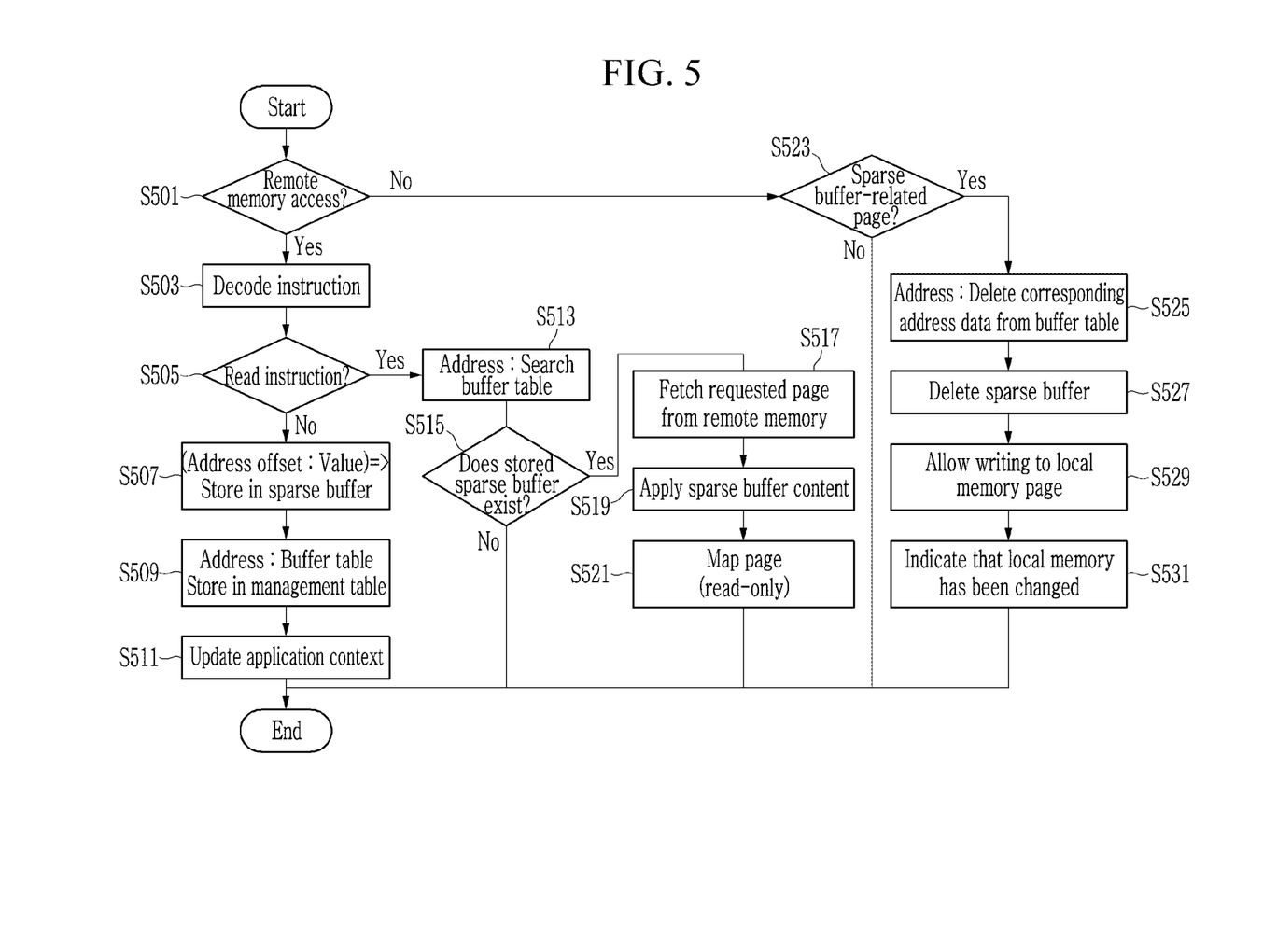
FIG. 5 is a diagram for explaining a memory access method according to an example embodiment of the present disclosure.

FIG. 5 is a diagram for explaining a memory access method according to an example embodiment of the present disclosure.

Referring to FIG. 5, it illustrates an execution flow of the sparse buffer manager 100 according to memory access control in a memory access method according to an example embodiment of the present disclosure.

Executed during processing of a page fault due to remote memory access, the method includes determining whether the remote memory access has occurred (S501). When an access to a page of the remote memory 30 occurs (S501: Yes), in order to identify a type of the access, it may include decoding the instruction (S503) and determining whether it is a read instruction (S505).

When it is determined that it is a write instruction (S505: No) (for example, when the access is a sparse write), the method may include allocating a sparse buffer and storing data for sparse writing in the sparse buffer (S507). In this case, step S507 may include storing an address offset for sparse writing in the sparse buffer. Next, the method may include using an address for the sparse writing as a key and a sparse buffer as a value to store them in a buffer table (S509) and updating an application context so that an instruction pointer points to a next instruction (S511).

When it is determined that it is a read instruction (S505: Yes), the method may proceed to step of searching the buffer table by using the address for the read access as a key (S513) and step of determining whether a sparse buffer corresponding to the address for the read access exists from the search result (S515).

When it is determined that the sparse buffer corresponding to the address for the read access exists (S515: Yes), the method may proceed to step of fetching a page from the remote memory 30 into the local memory 20 (S517), step of reflecting the data stored in the sparse buffer on the fetched page (S519), and step of mapping the reflected page as read-only to the address space (S521).

On the other hand, when the access to the page of the remote memory 30 does not occur (S501: No), that is, when the page of the local memory 20 is accessed, the method may include determining whether the corresponding page is a sparse buffer-related page (S523). When the corresponding page is the sparse buffer-related page (S523: Yes), the corresponding page is set to read-only, and the method may proceed to step of deleting a record related to the sparse buffer from the buffer table (S525), step of deleting the sparse buffer (S527), step of allowing write to the corresponding page of the local memory 20 (S529), and step of indicating that the corresponding page of the local memory 20 has been changed (S531).

Figure 6:
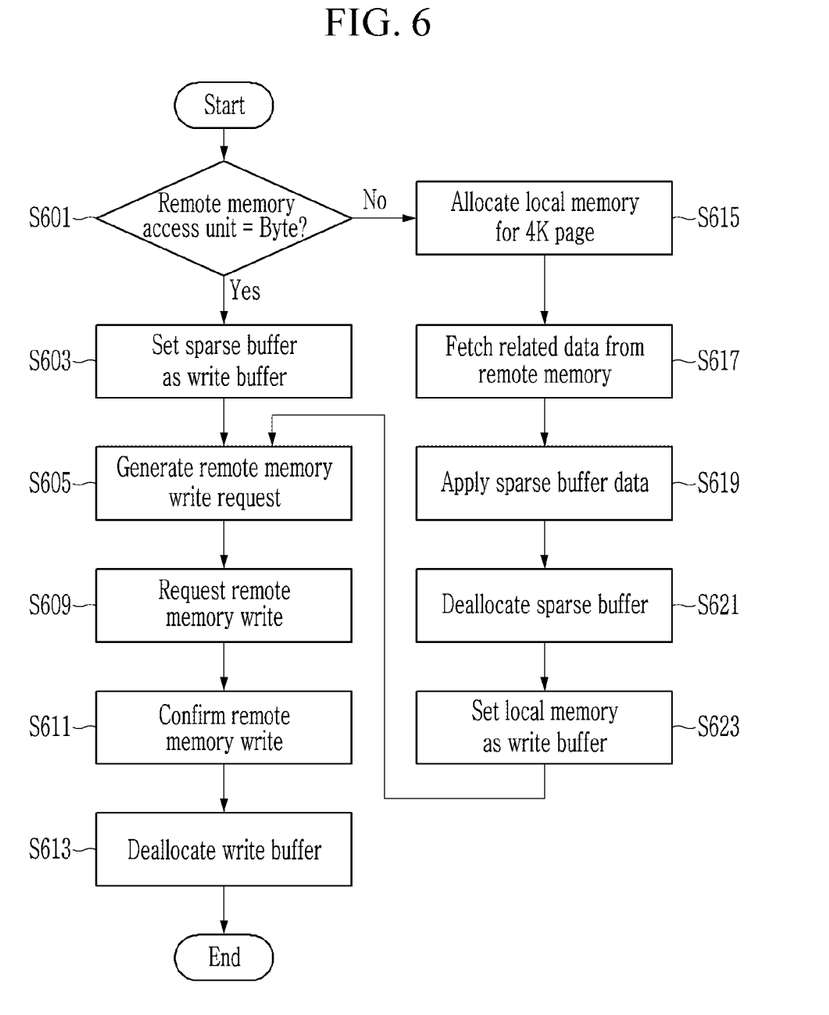
FIG. 6 is a diagram for explaining a memory access method according to an example embodiment of the present disclosure.

FIG. 6 is a diagram for explaining a memory access method according to an example embodiment of the present disclosure.

Referring to FIG. 6, it illustrates a case in which the sparse buffer manager 100 deallocates the write buffer (sparse buffer) in a situation in which the local memory 20 needs to be deallocated as the capacity of the local memory 20 becomes insufficient, in a memory access method according to an example embodiment of the present disclosure. This is a case in which the sparse buffer is also deallocated together because it also uses the local memory 20.

The method may include determining whether a unit of remote memory access is a byte (S601). When the unit of remote memory access is a byte (S601: Yes), in other words, when the remote memory 30 supports byte-level updates, the method may include setting the sparse buffer itself as a write buffer (S603).

Then, the method may proceed to step of generating a remote memory write request (S605), step of requesting remote memory write (S609), step of confirming the remote memory write (S611), and step of deallocating the write buffer (S613).

On the other hand, when the unit of remote memory access is not a byte (S601: No), in other words, when the remote memory 30 does not support the byte unit access, as in the above-described method, the method may proceed to step of allocating the local memory for 4K pages (S615), step of fetching the related data from the remote memory into the local memory (S617), step of applying the sparse buffer data (S619), step of deallocating the sparse buffer (S621), and step of setting the local memory as the write buffer (S623), and then may proceed to steps S605, S609, S611, and S613.

Figure 7:
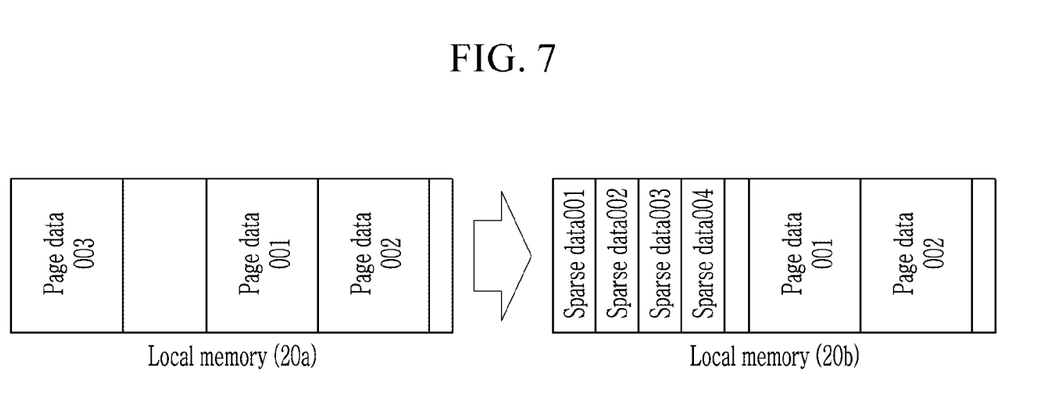
FIG. 7 is a diagram for explaining an example of a state of a local memory managed by a memory access method and device according to an example embodiment of the present disclosure.

FIG. 7 is a diagram for explaining an example of a state of a local memory managed by a memory access method and device according to an example embodiment of the present disclosure.

Referring to FIG. 7, a local memory 20a shows a state of the local memory under a memory access structure that does not consider the sparse access, and a local memory 20b shows a state of the local memory under a memory access structure of example embodiments of the present disclosure in which the efficiency is achieved in consideration of the sparse access as described above.

As can be seen by comparing the local memory 20a and the local memory 20b, due to the memory access structure according to the example embodiments of the present disclosure, the local memory 20b includes sparse data of a small size for the remote memory together with the page data of an existing page unit (for example, 4 KB). On the other hand, since the local memory 20a includes only page data of an existing page unit (for example, 4 KB), it can be seen that a usage rate thereof is lower than that of the local memory 20b in which with memory management in units of subpages.

In the disaggregated memory system, the local memory is a constituent element that provides storage of performance-sensitive data, and a usage rate thereof is affected by the number of valid data blocks that may be stored. In other words, a memory consistency model of the page unit may store wasted data in the local memory for the sparse data memory access pattern, and may waste network resources by generating unnecessary data transmission with the remote memory.

However, due to the memory management of the subpage unit according to the memory access structure according to the example embodiments of the present disclosure, by increasing the use rate of the local memory, more data may be stored in the local memory of the same capacity, and by reducing the data transmission with the remote memory, network resources may be saved.

On the other hand, in the performing of the sparse write on the data located in the remote memory, unlike the memory access structures that do not consider the sparse access, since it is possible to write it to the local memory without fetching it from the remote memory into the local memory, a cost of fetching into the remote memory may also be reduced.

Figure 8:
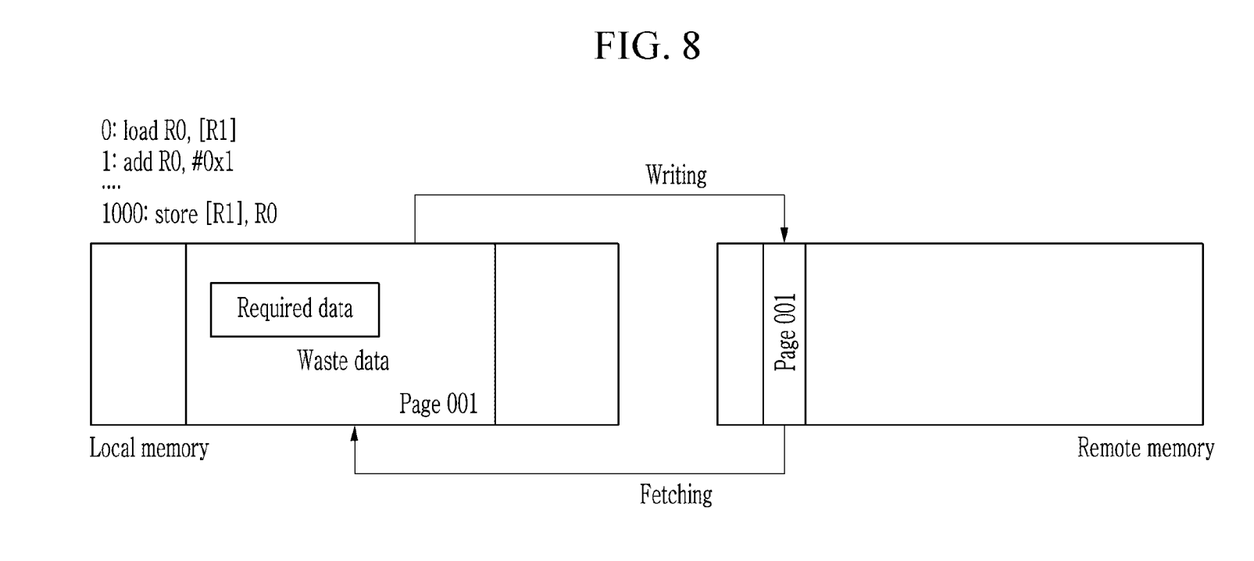
FIG. 8 and FIG. 9 are diagrams for explaining a memory access structure that does not consider sparse access.
Figure 9:
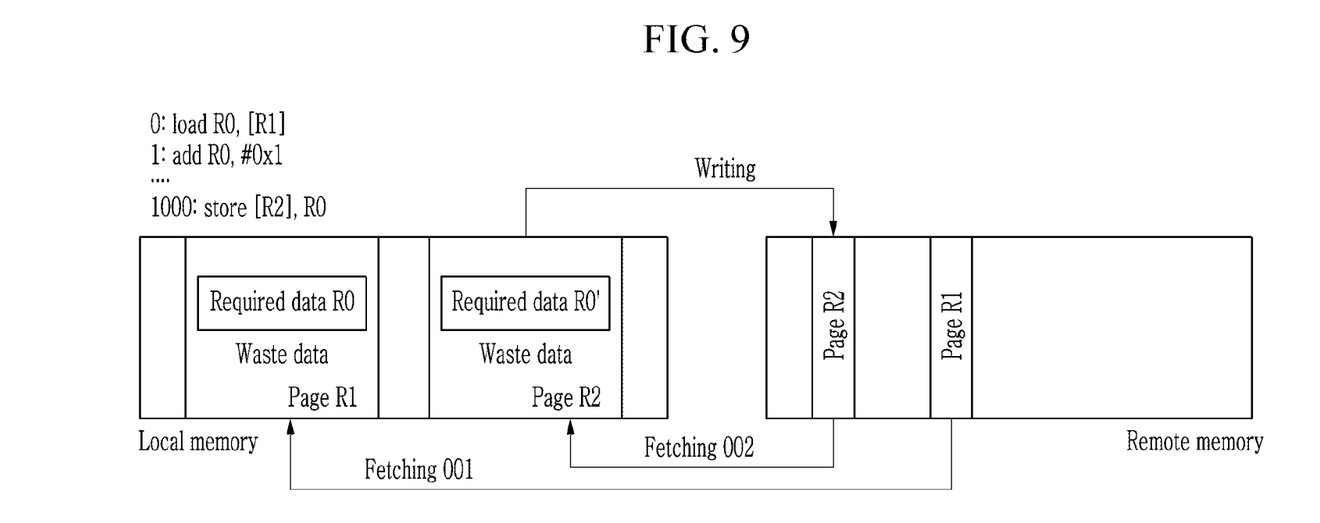

FIG. 8 and FIG. 9 are diagrams for explaining a memory access structure that does not consider sparse access.

Referring to FIG. 8 and FIG. 9, in the memory access structure of the page unit that does not consider the sparse access, it can be seen that when the sparse access occurs among the memory access patterns, it has high inefficiency.

That is, when an application's memory access is only 8 bytes for a random 4 kilobyte (KB) page, in the memory consistency model of the page unit, all 4 KB pages are fetched from the remote memory into the local memory, and access to 8 bytes of data is performed. This data access results in wasting the local memory by fetching the 4 KB page into the local memory and by using 4 KB to support the access, even though the size of the memory space actually required for the application is 8 bytes.

Referring to FIG. 8, for the application that access the data existing in the remote memory, the remote memory manager retrieves the requested data from the remote memory to the local memory and sets the execution environment so that the user application may access it. In this case, the application of FIG. 8 causes the following inefficiency by allocating 4 KB to the local memory even though load and store instructions are executed on 8 byte data.

First, it wastes the local memory. In FIG. 8, 8 byte data of page 001 existing in the remote memory is requested by the execution of the application, but in order to support this, the local memory of 4 KB is allocated. This causes potential performance deterioration by locating meaningless data even though the local memory significantly contributes to application performance.

Second, it causes delay time due to fetching of data that is not requested. After executing instruction 0 while executing the application of FIG. 8, after page 001 is written to the local memory, when page 001 is accessed again by instruction 1000, in order to execute the store instruction, the page 001 must be fetched back into the local memory from the remote memory. However, since the store instruction writes the corresponding data to the requested data location, as a result, the data is not needed, but by not determining it, and by fetching no longer meaningless and wasted data from the remote memory to the local memory, it consumes network bandwidth due to access delay time and fetching.

Third, page-level access tracking informs that the entire 4 KB page has been changed even though only 8 bytes of 4 KB have been updated. This requires a network bandwidth because, as a result, the waste data of the page 001 that is not actually updated or referenced is written back from the local memory to the remote memory. This resultantly uses unnecessary bandwidth and causes performance degradation of network access sensitive to delay time sharing the network.

Next, referring to FIG. 9, in instruction 0, data is fetched from page R1, and instruction 1 changes a value of data R0 read from the page R1 to generate a changed data R0'. After that, when instruction 1000 tries to write the changed data R0' to the page R2, and when the page R2 is not located in the local memory, fetch (fetch 002) is performed from the remote memory into the local memory. After that, the changed data R0' is reflected in the page R2 existing in the local memory, and then when the corresponding memory is not required, the page R2 is written to the remote memory. In such an execution, the waste data of the page R2, which is data not required by instruction 1000, must be fetched from the remote memory, and the corresponding waste data is written to the page R2, causing write amplification of the interconnect.

As such, in the disaggregated memory system that supports the memory consistency model of the page unit, it causes inefficiency performance with respect to the sparse access performed in the application, while the memory access method and device according to the example embodiments of the present disclosure may further realize fine-grain memory management.

Figure 10:
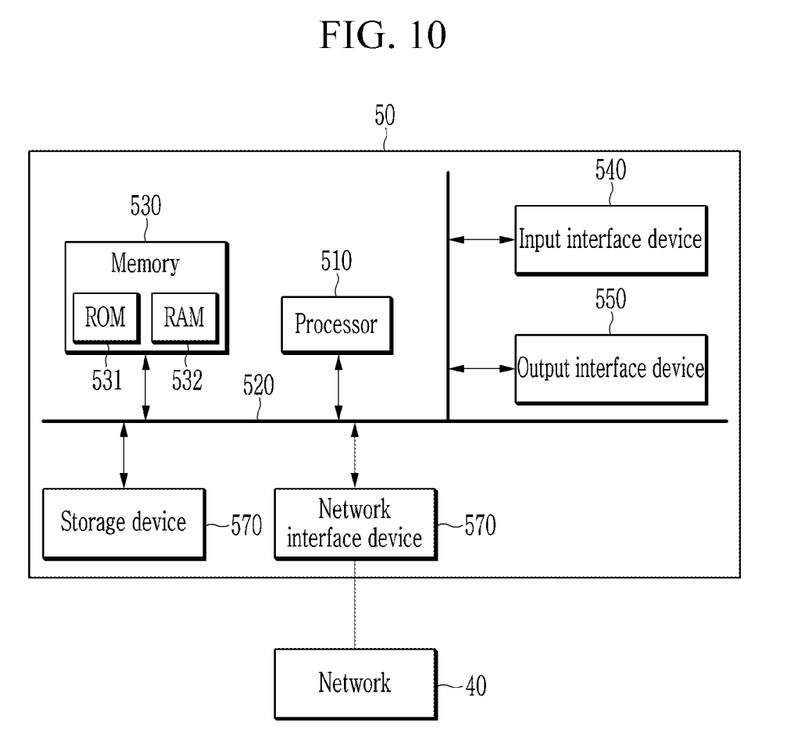
FIG. 10 is a block diagram for explaining a computing device for implementing the memory access method and device according to example embodiments of the present disclosure.

FIG. 10 is a block diagram for explaining a computing device for implementing the memory access method and device according to example embodiments of the present disclosure.

Referring to FIG. 10, the memory access method and device according to the example embodiments of the present disclosure may be implemented by using a computing device 50.

The computing device 50 may include at least one of a processor 510, a memory 530, a user interface input device 540, a user interface output device 550, and a storage device 560 in communication through a bus 520. The computing device 50 may also include a network interface 570 electrically connected to a network 40, for example, a wireless network. The network interface 570 may transmit or receive signals with other entities through the network 40.

The processor 510 may be implemented in various types such as an application processor (AP), a central processing unit (CPU), and a graphics processing unit (GPU), and may be a semiconductor device that executes instructions stored in the memory 530 or the storage device 560. The processor 510 may be configured to implement the functions and methods described with reference to FIG. 1 to FIG. 7.

The memory 530 and the storage device 560 may include various types of volatile or non-volatile storage media. For example, the memory may include a read-only memory (ROM) 531 and a random access memory (RAM) 532. In an example embodiment of the present disclosure, the memory 530 may be located inside or outside the processor 510, and the memory 530 may be connected to the processor 510 through various known means.

In addition, the memory accessing method and device according to the example embodiments of the present disclosure may be implemented as a program or software executed in the computing device 50, and the program or software may be stored in a computer-readable medium.

In addition, the memory accessing method and device according to the example embodiments of the present disclosure may be implemented with hardware that may be electrically connected to the computing device 50.

According to the example embodiments of the present disclosure described above, it is possible to reduce the access of the remote memory by using the sparse buffer when the sparse access occurs to save the network resources, to reduce the waste of the local memory, and to reduce the delay time.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

Although the example embodiment of the present disclosure has been described in detail hereinabove, the scope of the present disclosure is not limited thereto. That is, several modifications and alterations made by a person of ordinary skill in the art using a basic concept of the present disclosure as defined in the claims fall within the scope of the present disclosure.

What is claimed is:

1. A memory access method, comprising:
identifying, when an access to a page of a remote memory occurs, a type of the access;
allocating a sparse buffer when the access is a sparse write;
storing data for the sparse write in the sparse buffer;
storing an address for the sparse write as a key and the sparse buffer as a value in a buffer table; and
updating an instruction pointer to point to a next instruction,
wherein, when a write access to a page related to the sparse buffer in a local memory occurs, the method further comprises:
deleting a record related to the sparse buffer from the buffer table;
deleting the sparse buffer;
allowing write to the page related to the sparse buffer; and
indicating that the page related to the sparse buffer has been changed,
wherein the page related to the sparse buffer in the local memory is set to read-only.

2. The memory access method of claim 1, further comprising:
when a read access to the page of the remote memory occurs,
searching the buffer table by using an address for the read access as a key; and
determining from the searched result whether a sparse buffer corresponding to the address for the read access exists.

3. The memory access method of claim 2, further comprising:
when it is determined that the sparse buffer corresponding to the address for the read access exists,
fetching the page from the remote memory into the local memory;
reflecting the data stored in the sparse buffer to the fetched page; and
mapping the reflected page into an address space.

4. The memory access method of claim 2, further comprising:
when it is determined that the sparse buffer corresponding to the address for the read access does not exist,
fetching the page from the remote memory into the local memory; and
mapping the fetched page into an address space.

5. The memory access method of claim 1, wherein
the storing of the data for the sparse write in the sparse buffer comprises
storing an address offset for the sparse write in the sparse buffer.

6. The memory access method of claim 1, further comprising:
after the page is fetched into the local memory from the remote memory, when a memory shortage of the local memory occurs,
deleting the page from the local memory and maintaining the sparse buffer.

7. The memory access method of claim 6, further comprising:
after the page is deleted from the local memory, when a read access to the page occurs,
fetching the page from the remote memory into the local memory;
reflecting the data stored in the sparse buffer to the fetched page; and
mapping the reflected page into an address space.

8. The memory access method of claim 1, further comprising:
writing back the indicated page to the remote memory.

9. A memory access device, comprising:
a local memory into which a page of a remote memory is able to be fetched; and
a sparse buffer manager,
wherein the sparse buffer manager is configured to:
identify, when an access to the page of the remote memory occurs, a type of the access;
allocate a sparse buffer when the access is a sparse write;
store data for the sparse write in the sparse buffer;
store an address for the sparse write as a key and the sparse buffer as a value in a buffer table; and
update an instruction pointer to point to a next instruction,
wherein when a write access to a page related to the sparse buffer occurs in the local memory, the sparse buffer manager is configured to:
delete a record related to the sparse buffer from the buffer table;
delete the sparse buffer;
allow write to the page related to the sparse buffer; and
indicate that the page related to the sparse buffer has been changed,
wherein the page related to the sparse buffer in the local memory is set to read-only.

10. The memory access device of claim 9, wherein:
when a read access to the page of the remote memory occurs, the sparse buffer manager is configured to:
search the buffer table by using an address for the read access as a key; and
determine from the searched result whether a sparse buffer corresponding to the address for the read access exists.

11. The memory access device of claim 10, wherein:
when it is determined that the sparse buffer corresponding to the address for the read access exists, the sparse buffer manager is configured to:
fetch the page from the remote memory into the local memory;
reflect the data stored in the sparse buffer to the fetched page; and
map the reflected page into an address space.

12. The memory access device of claim 10, wherein:
when it is determined that the sparse buffer corresponding to the address for the read access does not exist, the sparse buffer manager is configured to:
fetch the page from the remote memory into the local memory; and
map the fetched page into an address space.

13. The memory access device of claim 9, wherein
the storing of the data for the sparse write in the sparse buffer comprises
storing an address offset for the sparse write in the sparse buffer.

14. The memory access device of claim 9, wherein
after the page is fetched into the local memory from the remote memory, when a memory shortage of the local memory occurs, the sparse buffer manager is configured to
delete the page from the local memory and maintain the sparse buffer.

15. The memory access device of claim 14, wherein:
after the page is deleted from the local memory, when a read access to the page occurs, the sparse buffer manager is configured to:
fetch the page from the remote memory into the local memory;
reflect the data stored in the sparse buffer to the fetched page; and
map the reflected page into an address space.

16. The memory access device of claim 9, wherein:
the sparse buffer writes back the indicated page to the remote memory.

* * * * *